(12) United States Patent
Adderly et al.

(10) Patent No.: US 9,274,782 B2
(45) Date of Patent: Mar. 1, 2016

(54) AUTOMATED COMPUTER APPLICATION UPDATE ANALYSIS

(71) Applicant: International Business Machines Corporation, Armonk, NY (US)

(72) Inventors: Darryl M. Adderly, Morrisville, NC (US); Jonathan W. Jackson, Durham, NC (US); Ajit Jariwala, Cary, NC (US); Eric B. Libow, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 14/136,593

(22) Filed: Dec. 20, 2013

(65) Prior Publication Data

US 2015/0178062 A1    Jun. 25, 2015

(51) Int. Cl.
*G06F 9/44*    (2006.01)
*G06F 9/445*    (2006.01)
*G06Q 10/06*    (2012.01)

(52) U.S. Cl.
CPC . *G06F 8/65* (2013.01); *G06Q 10/06* (2013.01)

(58) Field of Classification Search
CPC .................................. G06F 8/65; G06Q 10/06
USPC ........................................................ 717/170
See application file for complete search history.

(56) References Cited

U.S. PATENT DOCUMENTS 6,606,740 B1 * 8/2003 Lynn ...................... G06Q 10/06
                                                717/100
7,356,679 B1    4/2008 Le et al.
7,530,079 B2    5/2009 Stubbs et al.
(Continued)

FOREIGN PATENT DOCUMENTS

EP    2270725 A2    5/2011
WO    2014088398 A1    6/2014

OTHER PUBLICATIONS

Hauder et al. "A Framework for Efficient Data Analytics through Automatic Configuration and Customization of Scientific Workflows", 2011, IEEE.*

(Continued)

*Primary Examiner* — Wei Zhen
*Assistant Examiner* — Junchun Wu
(74) *Attorney, Agent, or Firm* — Penny L. Lowry; Joseph Petrokaitis (57) ABSTRACT

A comparison tool compares metadata that describes an original workflow and metadata that describes a customized workflow. The original workflow and the computer application provide original functionality. The customized workflow is a modified version of the original workflow. The customized workflow and the computer application provide customized functionality. Analysis results, such as a report, are generated that represent the customized functionality. The comparison tool may further compare the original workflow metadata and customized workflow metadata with metadata that describes an updated original workflow. The updated original workflow and an updated version of the computer application provide updated functionality. Analysis results may be generated that represent the customized functionality merged with updated functionality, and a merged workflow may be created. A workflow editor may generate the metadata by associating step-specific metadata, such as origin metadata, type-of-step metadata, and dependency metadata, with individual workflow steps in the workflows.

14 Claims, 4 Drawing Sheets

(56) References Cited

U.S. PATENT DOCUMENTS

| | | | |
|---|---|---|---|
| 7,945,907 B2* | 5/2011 | Dreiling | G06F 9/44505 717/168 |
| 8,245,223 B2 | 8/2012 | Bhatia et al. | |
| 8,255,871 B1 | 8/2012 | Kompella et al. | |
| 8,341,590 B1 | 12/2012 | Poole | |
| 8,499,352 B2* | 7/2013 | Mathur | G06F 21/52 713/188 |
| 2002/0091559 A1* | 7/2002 | Beniyama | G06Q 10/10 717/100 |
| 2005/0198639 A1* | 9/2005 | Matsui | 718/100 |
| 2006/0069599 A1* | 3/2006 | Hatoun | G06Q 10/0633 705/7.27 |
| 2007/0092783 A1* | 4/2007 | Gibbons | G06Q 10/06 705/7.12 |
| 2008/0126987 A1* | 5/2008 | Meschian | G06Q 10/06 715/825 |
| 2009/0019271 A1* | 1/2009 | Kawakami | G06Q 10/06 712/227 |
| 2009/0037870 A1* | 2/2009 | Santos-Gomez | G06Q 10/06 717/101 |
| 2009/0064090 A1 | 3/2009 | Anonsen et al. | |
| 2010/0049740 A1* | 2/2010 | Iwase et al. | 707/104.1 |
| 2010/0131533 A1* | 5/2010 | Ortiz | 707/758 |
| 2010/0131928 A1* | 5/2010 | Parthasarathy et al. | 717/126 |
| 2011/0131545 A1* | 6/2011 | Patrascu et al. | 717/100 |
| 2011/0225565 A1* | 9/2011 | van Velzen | G06F 9/5038 717/114 |
| 2011/0314466 A1 | 12/2011 | Berg et al. | |
| 2012/0116836 A1* | 5/2012 | Flores | G06Q 10/0633 705/7.27 |
| 2012/0180045 A1 | 7/2012 | Bhogal et al. | |
| 2013/0054299 A1* | 2/2013 | Deshpande | G06Q 10/06 705/7.26 |
| 2013/0185348 A1* | 7/2013 | Hall | G06F 15/16 709/203 |
| 2014/0040976 A1 | 2/2014 | Furuichi et al. | |
| 2014/0165135 A1 | 6/2014 | Fitterer et al. | |
| 2014/0372533 A1* | 12/2014 | Fu et al. | 709/204 |

OTHER PUBLICATIONS

Gil et al. "Examining the Challenges of Scientific Workflows", Dec. 2007, IEEE, vol. 40, No. 12, pp. 24-32.*

Jensen et al. "Using Characteristics of Computational Science Schemas for Workflow Metadata Management", 2008, IEEE.*

Gil, Y., et al, "Mind Your Metadata: Exploiting Semantics for Configuration, Adaptation, and Provenance in Scientific Workflows," Proceedings of the Tenth International Semantic Web Conference (ISWC), Bonn, Germany, Oct. 23-27, 2011.

Gil, Y., et al, "Workflow Matching Using Semantic Metadata," Proceedings of the Fifth International Conference on Knowledge Capture (K-CAP), pp. 121-128, Redondo Beach, California, Sep. 1-4, 2009, ISBN: 978-1-60558-658-8, doi: 10.1145/1597735.1597757.

Inamoto, A.; "Modeling of Object Behavior and Scheduling in Production Workflow," Advances in Production Management Systems, Proceedings of the 6th IFIP TC5/WG5.7 International Conference on Advances in Production Management Systems—APMS'96, pp. 407-414, 1996.

Wang, X., "Design of Collaborative Workflow Model Based on Web Service," Multimedia Technology (ICMT), 2010 International Conference on Multimedia Technology, vol., No., pp. 1,4, Oct. 29-31, 2010, doi: 10.1109/ICMULT.2010.5629834.

Adderly et al., "Customized Application Performance Testing of Upgraded Software," filed Apr. 16, 2015, p. 1-34, U.S. Appl. No. 14/687,958.

Alur et al., "LinkIntegrity+ : A Web Asset Integrity Solution," IBM Almaden Research Center, 2008, 10 Pages, San Jose, CA.

Mell et al., "The NIST Definition of Cloud Computing," National Institute of Standards and Technology, Information Technology Laboratory, Oct. 7, 2009, 2 Pages, Version 15.

Wikipedia, "Amazon Elastic Compute Cloud," Wikipedia: the Free Encyclopedia, Last Modified on Dec. 9, 2014, p. 1-10, http://en.wikipedia.org/wiki/Amazon_Elastic_Compute_Cloud, Accessed on Feb. 3, 2015.

Wikipedia, "Google Compute Engine," Wikipedia: the Free Encyclopedia, Last Modified on Dec. 1, 2014, p. 1-8, http://en.wikipedia.org/wiki/Google_Compute_Engine, Accessed on Feb. 3, 2015.

Wikipedia, "Microsoft Azure," Wikipedia: the Free Encyclopedia, Last Modified on Jan. 29, 2015, p. 1-10, http://en.wikipedia.org/wiki/Microsoft_Azure, Accessed on Feb. 3, 2015.

* cited by examiner

AUTOMATED COMPUTER APPLICATION UPDATE ANALYSIS

BACKGROUND

The present disclosure relates generally to computer application configuration management and more particularly to preserving customized functionality when performing application updates in a client environment.

An original workflow delivered to a client for use with a computer application may be customized for that particular client environment, providing customized functionality. When revisions containing updated functionality become available for the computer application, customized functionality may need to be preserved when installing the revisions in the client environment.

SUMMARY

Disclosed herein are embodiments of a method and computer program product for analyzing workflows associated with a computer application installed in a client environment. Metadata describing an original workflow and metadata describing a customized workflow are identified. The original workflow and the computer application provide original functionality. The customized workflow is a modified version of the original workflow. The customized workflow and the computer application provide customized functionality.

A computer processor compares the original workflow metadata and the customized workflow metadata to generate analysis results representing the customized functionality. The analysis results may in the form of a report. The computer processor may further compare metadata describing an updated original workflow. The updated original workflow is a modified version of the original workflow. The updated original workflow and an updated version of the computer application provide updated functionality. Based on the further comparing, the computer processor may generate additional analysis results representing merging the customized functionality with the updated functionality, and a merged workflow may be created. The merged workflow and the updated version of the computer application may provide the customized functionality and the updated functionality. In some embodiments, the various metadata describing the workflows are generated and stored. The metadata may be generated by associating step-specific metadata, such as origin metadata, type-of-step metadata, and dependency metadata, with individual workflow steps in the various workflows.

Also disclosed herein are embodiments of a system for analyzing workflows associated with a computer application installed in a client environment. A comparison tool may compare the metadata from the original workflow, the updated original workflow, and the customized workflow. The comparison tool may also generate the analysis results, and may create the merged workflow. A workflow editor tool may generate the various metadata and store the metadata in a metadata store.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

DETAILED DESCRIPTION

In this detailed description, reference is made to the accompanying drawings, which illustrate example embodiments. It is to be understood that other embodiments may be utilized and structural changes may be made without departing from the scope of the disclosure. The terminology used herein is for the purpose of describing particular embodiments only and is not intended to be limiting. In accordance with disclosed features, methods, systems, and computer program products are disclosed for automated computer application update analysis.

Developers of a computer application may provide original workflows that ship with the computer application. Such workflows may include a number of workflow steps. For example, an Enterprise Resource Planning (ERP) application may provide original workflows that include a number of business process steps. Individual clients installing the application, however, may have requirements that are not fully met with the original workflows. To meet such requirements, one or more of the original workflows may be modified to create customized workflows for the client. Changing requirements may necessitate multiple modifications to the original workflows over time.

During the life cycle of the computer application, developers may provide revisions to the application along with updated original workflows. These updated versions of the computer application may provide additional functionality such as additional features, enhancements to existing features, and bug fixes. Sometimes a new revision to the computer application may provide solutions to requirements that were previously met only through customized workflows. The need to preserve the customized functionality provided by customized workflows may create significant obstacles when installing application updates in a client environment.

During a typical computer application update installation, existing customizations and configurations must be analyzed not only to determine how the customized functionality differs from the original functionality of the currently installed version of the computer application, but also to determine how much, if any, of the customized functionality is provided in the updated version of the computer application. Even if the application developer provides indications of which modules have changed in the updated version, such module-level information may be insufficient to compare the new or updated features against the customizations in place in the client environment. This analysis may involve an enormous amount of man-hours developing a low-level view of what changes have been made to the modules, how these changes affect current customizations, and which customizations may now be obsolete in view of the new version of the application. Developing this low-level view requires intimate knowledge of both the computer application and the client customizations, and may therefore be lengthy, resource-intensive, and costly.

Figure 1:
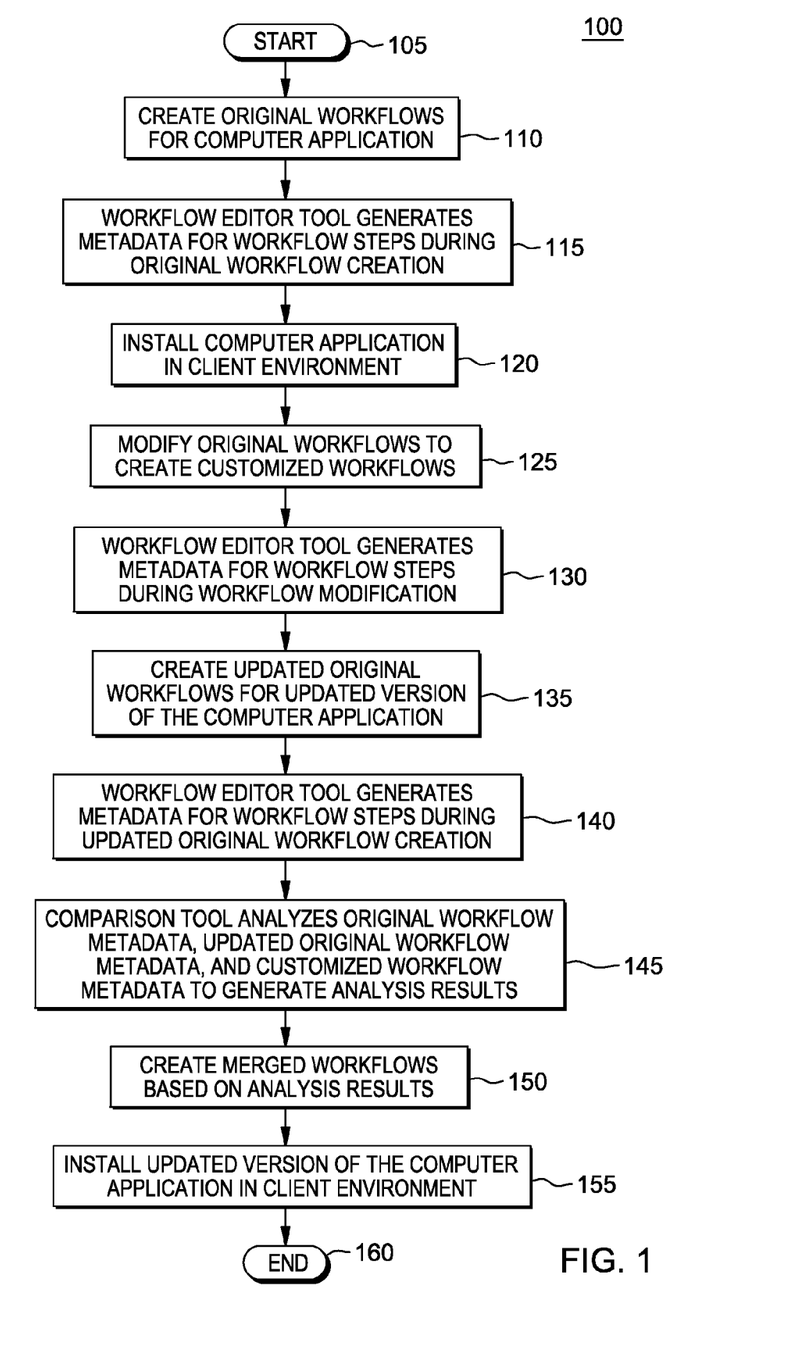
FIG. 1 depicts a flow diagram of an example method for installing an updated version of a computer application in a client environment with automated update analysis.

Automating some or all of this computer application update analysis may reduce the time, resources, and other costs involved in installing an updated version of the computer application in a client environment. An example method 100 for installing an updated version of a computer application in a client environment with automated update analysis is illustrated in FIG. 1. From start 105, application developers create the original workflows for the computer application at 110. These original workflows ship to the client along with the computer application for installation in the client environment, and these original workflows along with the computer application provide original functionality. Developers may use a workflow editor tool associated with the computer application when creating the original workflows. This workflow editor tool generates metadata describing the workflow steps during creation of the original workflows at 115. Within this disclosure, the term "original functionality" is not limited to describing only the functionality provided by the first version of a computer application; rather, "original functionality" describes the current functionality of an application relative to functionality provided in an updated version.

The computer application is then installed in the client environment at 120. At 125, one or more of the original shipping workflows may be modified to create customized workflows. Such modifications may be performed at the time the computer application is installed to support initial requirements, and additional modifications may be performed at a later time to support later-identified requirements. The workflow editor tool generates metadata describing the modified workflow steps during modification of the workflows at 130.

Developers may update the application, for example to provide additional or changed functionality, and may also update the original shipping workflows for the computer application at 135. These updated original workflows ship to the client along with the updated version of the computer application for installation in the client environment, and these updated workflows along with the application updates provide updated functionality. The workflow editor tool generates metadata describing the new or modified workflow steps during creation of the updated workflows at 140. Note that when a future update is made to the application, these updated original workflows become the "original workflows" relative to the future updated workflows.

At 145, a computer-based comparison tool provides an automated comparison of the original workflows, the updated original workflows, and the customized workflows to assist in upgrading to the new version of the computer application in the client environment. The comparison tool compares and contrasts the metadata generated by the workflow editor tool to generate a detailed analysis representing the customized functionality, and also how that customized functionality may be merged with the updated functionality available in the new version of the computer application. Those responsible for the application upgrade may then use the analysis results generated by the comparison tool, along with semantic interpretation of the client's customization and knowledge of the low-level changes present in the new version of the computer application to provide a faster, more efficient, and less resource-intensive upgrade process.

Based on the analysis results, workflows may be created at 150 that merge the customized functionality with the updated functionality provided by the updated original workflows and the updated version of the computer application. These merged workflows may then be used to take advantage of the application updates while retaining any customized functionality not provided by the updates. The updated version of the computer application may then be installed in the client environment at 155, and the method ends at 160.

Figure 2:
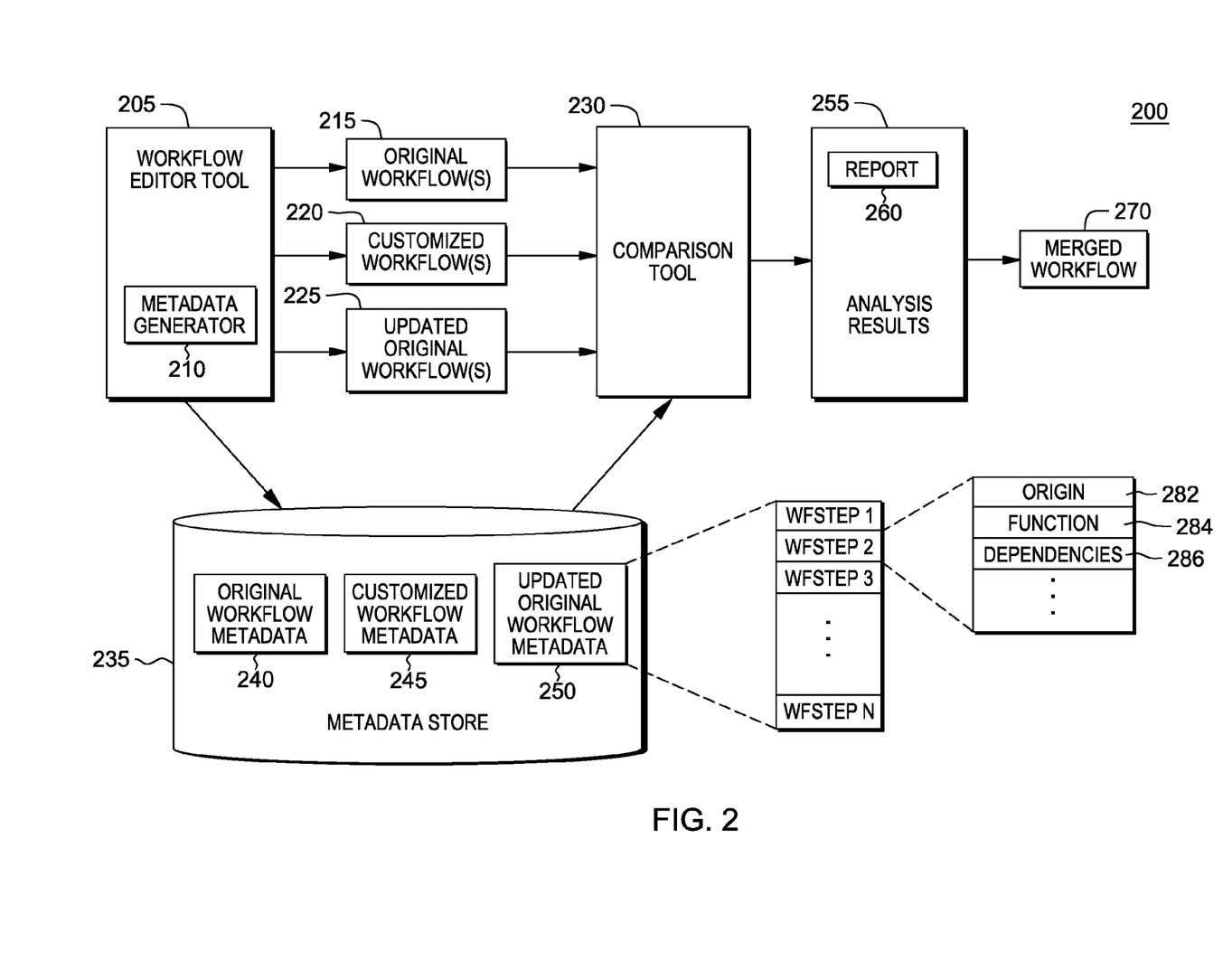
FIG. 2 depicts a block diagram of an example system for analyzing workflows associated with a computer application installed in a client environment.

An example system 200 for analyzing workflows associated with a computer application installed in a client environment is shown in FIG. 2. A workflow editor tool 205 used in creating and modifying workflows for the computer application contains a metadata generator 210. When a user creates or modifies a workflow, metadata generator 210 associates step-specific metadata with the steps in the workflow. This metadata is then stored in metadata store 235. For example, metadata 240 represents the metadata generated for steps in an original workflow 215, metadata 245 represents the metadata generated for steps in a customized workflow 220, and metadata 250 represents the metadata generated for steps in an updated original workflow 225.

As workflows are developed by vendors or customized in the client environment, metadata generator 210 in workflow editor tool 205 captures metadata documenting steps in the workflow and may organize the metadata into metadata categories such as origin metadata, function metadata, dependency metadata, integration metadata, and other types of metadata. For example, origin metadata 282 may describe who created and/or modified workflow step 2 in an updated original workflow. Examples of origin metadata are "vendor", "integrator", and "customer". Function metadata 284 may describe what workflow step 2 is used for or the type of step. Examples of type-of-step metadata are "integration" and "approval". Dependency metadata 286 may include the other workflow steps upon which workflow step 2 depends. Note that these specific metadata and categories of metadata are only examples, and many other specific metadata and categories of metadata are contemplated. After generating the metadata, workflow editor tool 205 may store the metadata in metadata store 235.

Comparison tool 230 analyzes the workflows and workflow metadata and generates analysis results 255. Prior to performing the analysis, comparison tool 230 may retrieve the target workflow metadata from metadata store 235. Comparison tool 230 may compare customized workflow metadata 245 to original workflow metadata 240 and produce analysis results 255 representing the customized functionality. This customized functionality may be functionality needed to meet requirements that are unmet by the original or default functionality of the computer application.

Comparison tool 230 may also compare updated original workflow metadata 250 to original workflow metadata 240 and produce analysis results 255 representing the updated functionality provided by new version of the computer application. Comparison tool 230 may combine these results with the results of the customized functionality analysis to aid in determining how the updated functionality may be implemented while preserving the customized functionality. In some embodiments, comparison tool 230 may produce a report 260 for use in creating a merged workflow 270. Such a report 260 may document, for example, which customized workflow steps should be retained and migrated into merged workflow 270, and which customized workflow steps are no longer required when coupled with the updated version of the computer application. In some embodiments, comparison tool 230 may automatically modify analyzed workflows or workflow steps for use in merged workflow 270. In some embodiments, comparison tool 230 may automatically generate merged workflow 270.

Figure 3:
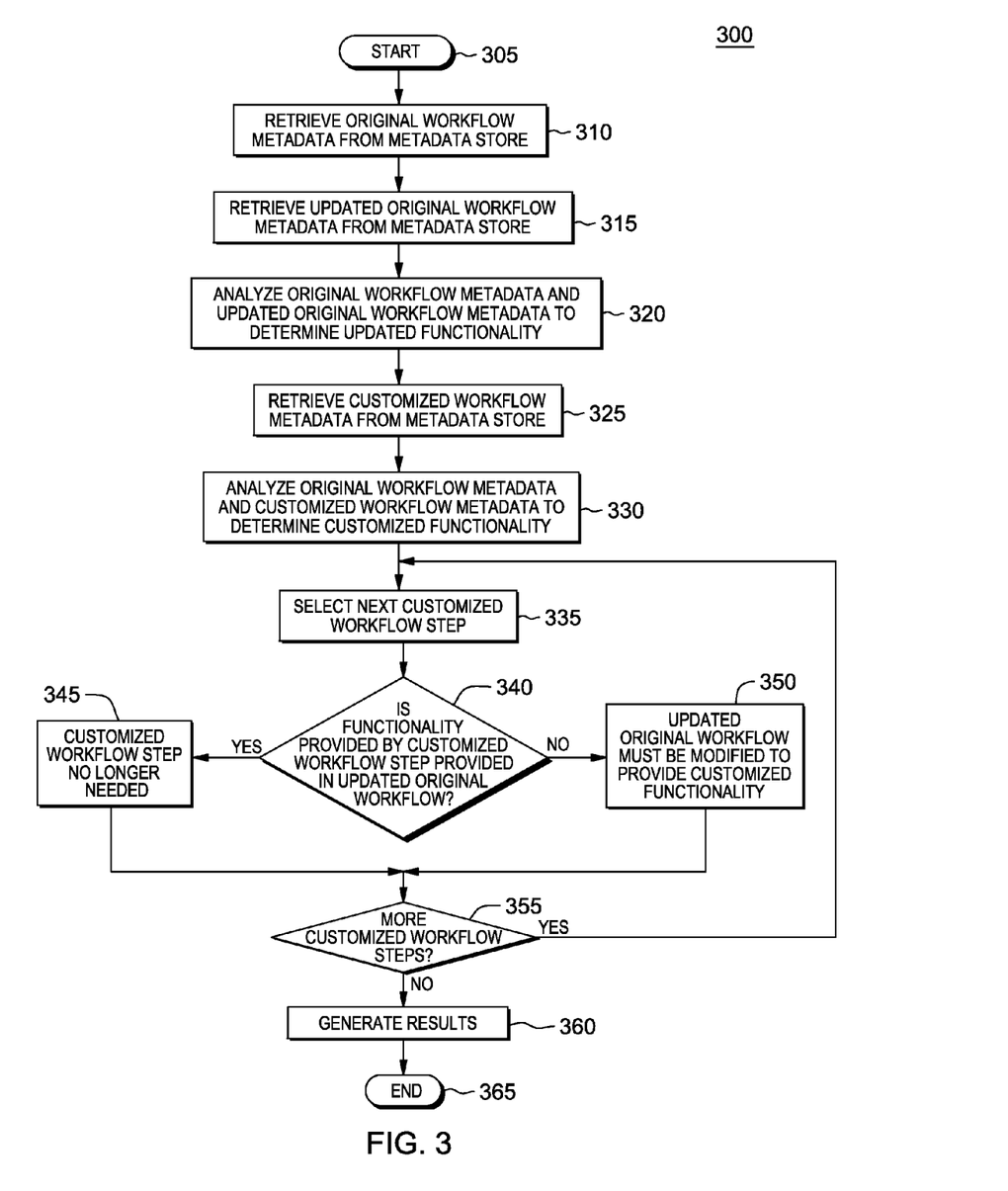
FIG. 3 depicts a flow diagram of an example method for analyzing workflows associated with a computer application installed in a client environment.

FIG. 3 is a flow diagram of an example method 300 for analyzing workflows associated with a computer application installed in a client environment. At start 305, a comparison tool retrieves original workflow metadata associated with an original version of the computer application from a metadata store at 310, and retrieves updated original workflow metadata associated with an updated version of the computer application from the metadata store at 315. The comparison tool then compares the retrieved original and updated workflow metadata to determine what new functionality exists in the updated workflow at 320.

At 325, the comparison tool retrieves customized workflow metadata associated with the original version of the computer application from a metadata store, and compares the retrieved original and customized metadata to determine what customized functionality exists in the customized workflow at 330. Each step in the customized workflow may then be selected at 335 and evaluated at 340 to determine whether the customized workflow step should be retained, retained and modified, or eliminated to preserve the customized functionality in a merged workflow associated with the updated version of the computer application. This process is described in more detail in the following paragraph.

The comparison tool selects a first workflow step in the customized workflow at 335 in preparation for determining whether the selected step should be retained, modified, or eliminated. Whether the functionality provided by the selected workflow step is provided in the updated original workflow in conjunction with the updated version of the computer application is determined at 340. If the functionality is provided in the updated version at 340, then the selected workflow step is no longer needed at 345. If the functionality is not provided in the updated version at 340, then the updated original workflow must be modified at 350 to preserve the customized functionality provided by the selected step. Depending on the specific customized functionality provided by the selected step, the selected step may require insertion into the updated original workflow, or a step in the updated original workflow may require modification to provide the customized functionality. Additions and modification to the updated original workflow result in a merged workflow providing the updated functionality while preserving the customized functionality.

If more steps in the customized workflow remain to be processed at 355, then the method returns to select the next step at 335. If all steps in the customized workflow have been processed at 355, then the comparison tool generates analysis results at 360 and ends at 365. Analysis results may include a report documenting how a merged workflow may be modified. Analysis results may also include actual workflow modifications, along with a report showing what was modified and whether additional manual modifications may be required.

Figure 4:
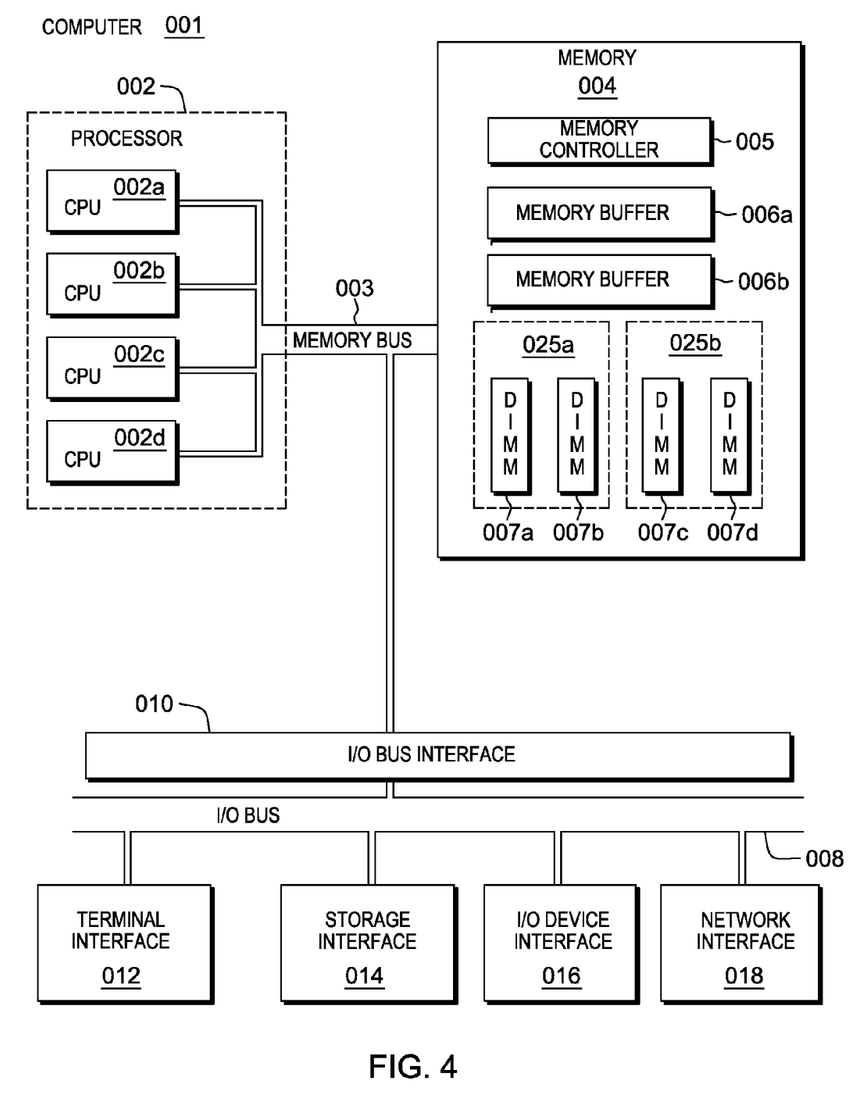
FIG. 4 depicts a high-level block diagram of an example system for implementing one or more embodiments of the invention.

FIG. 4 depicts a high-level block diagram of an example system for implementing one or more embodiments of the invention. The mechanisms and apparatus of embodiments of the present invention apply equally to any appropriate computing system. The major components of the computer system 001 comprise one or more CPUs 002, a memory subsystem 004, a terminal interface 012, a storage interface 014, an I/O (Input/Output) device interface 016, and a network interface 018, all of which are communicatively coupled, directly or indirectly, for inter-component communication via a memory bus 003, an I/O bus 008, and an I/O bus interface unit 010.

The computer system 001 may contain one or more general-purpose programmable central processing units (CPUs) 002A, 002B, 002C, and 002D, herein generically referred to as the CPU 002. In an embodiment, the computer system 001 may contain multiple processors typical of a relatively large system; however, in another embodiment the computer system 001 may alternatively be a single CPU system. Each CPU 002 executes instructions stored in the memory subsystem 004 and may comprise one or more levels of on-board cache.

In an embodiment, the memory subsystem 004 may comprise a random-access semiconductor memory, storage device, or storage medium (either volatile or non-volatile) for storing data and programs. In another embodiment, the memory subsystem 004 may represent the entire virtual memory of the computer system 001, and may also include the virtual memory of other computer systems coupled to the computer system 001 or connected via a network. The memory subsystem 004 may be conceptually a single monolithic entity, but in other embodiments the memory subsystem 004 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory or memory subsystem 004 may contain elements for control and flow of memory used by the CPU 002. This may include all or a portion of the following: a memory controller 005, one or more memory buffers 006 and one or more memory devices 007. In the illustrated embodiment, the memory devices 007 may be dual in-line memory modules (DIMMs), which are a series of dynamic random-access memory (DRAM) chips 015a-015n (collectively referred to as 015) mounted on a printed circuit board and designed for use in personal computers, workstations, and servers. The use of DRAMs 015 in the illustration is exemplary only and the memory array used may vary in type as previously mentioned. In various embodiments, these elements may be connected with buses for communication of data and instructions. In other embodiments, these elements may be combined into single chips that perform multiple duties or integrated into various types of memory modules. The illustrated elements are shown as being contained within the memory subsystem 004 in the computer system 001. In other embodiments the components may be arranged differently and have a variety of configurations. For example, the memory controller 005 may be on the CPU 002 side of the memory bus 003. In other embodiments, some or all of them may be on different computer systems and may be accessed remotely, e.g., via a network.

Although the memory bus 003 is shown in FIG. 4 as a single bus structure providing a direct communication path among the CPUs 002, the memory subsystem 004, and the I/O bus interface 010, the memory bus 003 may in fact comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 010 and the I/O bus 008 are shown as single respective units, the computer system 001 may, in fact, contain multiple I/O bus interface units 010, multiple I/O buses 008, or both. While multiple I/O interface units are shown, which separate the I/O bus 008 from various communications paths running to the various I/O devices, in other embodiments some or all of the I/O devices are connected directly to one or more system I/O buses.

In various embodiments, the computer system 001 is a multi-user mainframe computer system, a single-user system, or a server computer or similar device that has little or no direct user interface, but receives requests from other computer systems (clients). In other embodiments, the computer system 001 is implemented as a desktop computer, portable computer, laptop or notebook computer, tablet computer, pocket computer, telephone, smart phone, network switches or routers, or any other appropriate type of electronic device.

FIG. 4 is intended to depict the representative major components of an exemplary computer system 001. But individual components may have greater complexity than represented in FIG. 4, components other than or in addition to those shown in FIG. 4 may be present, and the number, type, and configuration of such components may vary. Several particular examples of such complexities or additional variations are disclosed herein. The particular examples disclosed are for example only and are not necessarily the only such variations.

The memory buffer 006, in this embodiment, may be an intelligent memory buffer, each of which includes an exemplary type of logic module. Such logic modules may include hardware, firmware, or both for a variety of operations and tasks, examples of which include: data buffering, data splitting, and data routing. The logic module for memory buffer 006 may control the DIMMs 007, the data flow between the DIMM 007 and memory buffer 006, and data flow with outside elements, such as the memory controller 005. Outside elements, such as the memory controller 005 may have their own logic modules that the logic module of memory buffer 006 interacts with. The logic modules may be used for failure detection and correcting techniques for failures that may occur in the DIMMs 007. Examples of such techniques include: Error Correcting Code (ECC), Built-In-Self-Test (BIST), extended exercisers, and scrub functions. The firmware or hardware may add additional sections of data for failure determination as the data is passed through the system. Logic modules throughout the system, including but not limited to the memory buffer 006, memory controller 005, CPU 002, and even the DRAM 0015 may use these techniques in the same or different forms. These logic modules may communicate failures and changes to memory usage to a hypervisor or operating system. The hypervisor or the operating system may be a system that is used to map memory in the system 001 and tracks the location of data in memory systems used by the CPU 002. In embodiments that combine or rearrange elements, aspects of the firmware, hardware, or logic modules capabilities may be combined or redistributed. These variations would be apparent to one skilled in the art.

Embodiments described herein may be in the form of a system, a method, or a computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Embodiments of the invention may also be delivered as part of a service engagement with a client corporation, non-profit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature. The exemplary environments are not intended to limit the present disclosure. Indeed, other alternative hardware and/or program environments may be used without departing from the scope of embodiments of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for analyzing workflows associated with a computer application, the computer application installed in a client environment, the method comprising:
   identifying first metadata describing an original workflow, the original workflow providing an original configuration of and the computer application, the original configuration providing original functionality;
   identifying second metadata describing a customized workflow, wherein the customized workflow is a modified version of the original workflow, the customized workflow providing a customized configuration of the computer application, the customized configuration providing customized functionality different from the original functionality;
   comparing, by a computer processor, the first metadata and the second metadata; and generating, based on the comparing, analysis results representing the customized functionality;
   identifying third metadata describing an updated original workflow, wherein the updated original workflow is a second modified version of the original workflow, the updated original workflow providing an updated configuration of an updated version of the computer application, the updated configuration providing updated functionality different from the original functionality and different from the customized functionality;
   further comparing, by the computer processor, the third metadata with the first metadata and the second metadata;
   generating, based on the further comparing, second analysis results representing customized updated functionality, the customized updated functionality including the customized functionality and the updated functionality; and
   creating a merged workflow based on the second analysis results, the merged workflow and the updated version of the computer application providing the customized updated functionality.

2. The method of claim 1, further comprising:
   generating, with a workflow editor tool, the second metadata describing the customized workflow; and
   storing the second metadata in a metadata store.

3. The method of claim 2, wherein the customized workflow includes a plurality of workflow steps, and wherein the generating the second metadata describing the customized workflow comprises:
   associating step-specific metadata with at least one of the plurality of workflow steps.

4. The method of claim 1, wherein the analysis results comprises a report.

5. The method of claim 1, further comprising:
   retrieving at least one of the first metadata and the second metadata from a metadata store.

6. The method of claim 1, wherein each of the workflows includes a plurality of workflow steps, wherein each workflow step is associated with step-specific metadata, wherein the step-specific metadata is organized into metadata categories, and wherein the metadata categories include at least one of an origin category, a type-of-step category, and a dependency category.

7. A system for analyzing workflows associated with a computer application, the computer application installed in a client environment, the system comprising: a memory; and
   at least one processor in communication with the memory, wherein the computer system is configured to perform a method, the method comprising:
   identifying first metadata describing an original workflow, the original workflow providing an original configuration of the computer application, the original configuration providing original functionality;
   identifying second metadata describing a customized workflow, wherein the customized workflow is a modified version of the original workflow, the customized workflow providing a customized configuration of the computer application, the customized configuration providing customized functionality different from the original functionality;
   comparing, by a computer processor, the first metadata and the second metadata; and generating, based on the comparing, analysis results representing the customized functionality;
   identifying third metadata describing an updated original workflow, wherein the updated original workflow is a second modified version of the original workflow, the updated original workflow providing updated configuration of an updated version of the computer application, the updated configuration providing updated functionality different from the original functionality and different from the customized functionality;
   further comparing, by the computer processor, the third metadata with the first metadata and the second metadata;
   generating, based on the further comparing, second analysis results representing customized updated functionality, the customized updated functionality including the customized functionality and the updated functionality; and
   creating a merged workflow based on the second analysis results, the merged workflow and the updated version of the computer application providing the customized updated functionality.

8. The system of claim 7, the method further comprising:
   generating, with a workflow editor tool, the second metadata describing the customized workflow; and
   storing the second metadata in a metadata store.

9. The system of claim 8, wherein the customized workflow includes a plurality of workflow steps, and wherein the generating the second metadata describing the customized workflow comprises:
   associating step-specific metadata with at least one of the plurality of workflow steps.

10. The system of claim 7, wherein the analysis results comprises a report.

11. The system of claim 7, the method further comprising:
    retrieving at least one of the first metadata and the second metadata from a metadata store.

12. The system of claim 7, wherein each of the workflows includes a plurality of workflow steps, wherein each workflow step is associated with step-specific metadata, wherein the step-specific metadata is organized into metadata categories, and wherein the metadata categories include at least one of an origin category, a type-of-step category, and a dependency category.

13. A computer program product comprising a non-transitory computer readable storage medium having program code embodied therewith, the program code executable by a computer system to perform a method for analyzing workflows associated with a computer application installed in a client environment, the method comprising:

identifying first metadata describing an original workflow, the original workflow providing an original configuration of the computer application, the original configuration providing original functionality;

identifying second metadata describing a customized workflow, wherein the customized workflow is a modified version of the original workflow, the customized workflow providing a customized configuration of the computer application, the customized configuration providing customized functionality different from the original functionality;

comparing, by a computer processor, the first metadata and the second metadata; and generating, based on the comparing, analysis results representing the customized functionality;

identifying third metadata describing an updated original workflow, wherein the updated original workflow is a second modified version of the original workflow, the updated original workflow providing an updated configuration of an updated version of the computer application, the updated configuration providing updated functionality different from the original functionality and different from the customized functionality;

further comparing, by the computer processor, the third metadata with the first metadata and the second metadata;

generating, based on the further comparing, second analysis results representing customized updated functionality, the customized updated functionality including merging the customized functionality with the updated functionality; and creating a merged workflow based on the second analysis results, the merged workflow and the updated version of the computer application providing the customized updated functionality.

14. The computer program product of claim 13, wherein the method further comprises:

generating, with a workflow editor tool, the second metadata describing the customized workflow; and storing the second metadata in a metadata store.

* * * * *